United States Patent [19]

Hayashi

[11] Patent Number: 4,681,179
[45] Date of Patent: * Jul. 21, 1987

[54] COOLING SYSTEM FOR USE IN CAB-OVER TYPE VEHICLES

[75] Inventor: Yoshimasa Hayashi, Kamakura, Japan

[73] Assignee: Nissan Motor Co., Ltd., Yokohama, Japan

[*] Notice: The portion of the term of this patent subsequent to Oct. 29, 2002 has been disclaimed.

[21] Appl. No.: 676,426

[22] Filed: Nov. 29, 1984

[30] Foreign Application Priority Data

Nov. 30, 1983 [JP] Japan ............................ 58-226398

[51] Int. Cl.⁴ ............................................. B60K 11/04
[52] U.S. Cl. .................................. 180/68.4; 123/41.21
[58] Field of Search .............. 123/41.12, 41.21, 41.27; 165/32, 39; 180/68.1, 68.4

[56] References Cited

U.S. PATENT DOCUMENTS

| | | | |
|---|---|---|---|
| 1,806,382 | 5/1931 | Barlow | 180/68.4 |
| 1,949,753 | 3/1934 | Meadows | 180/68.4 |
| 3,499,481 | 3/1970 | Aurea | 123/41.21 |
| 3,996,999 | 12/1976 | Termont et al. | 180/68.4 |
| 4,367,699 | 1/1983 | Evans | 123/41.23 |

FOREIGN PATENT DOCUMENTS 0059423  9/1982  European Pat. Off. .

Primary Examiner—John J. Love
Assistant Examiner—Richard M. Camby
Attorney, Agent, or Firm—Schwartz, Jeffery, Schwaab, Mack, Blumenthal & Evans

[57] ABSTRACT

In order to increase cabin space and simultaneously increase the amount of engine cooling which can be effected by natural air drafts which occur during forward running of the vehicle, the engine radiator is disposed on a forward portion of the vehicle roof and arranged to receive coolant vapor generated in the engine coolant jacket. The coolant is condensed and returned to the coolant jacket via a level sensor controlled pump in a manner which maintain the structure of the engine subject to high heat flux securely immersed in coolant.

When the engine is stopped the negative pressure which develops due to the condensation of the vapor is used to induct coolant from a reservoir in a manner to fill the system and obviate any negative pressure which would otherwise tend to induct contamination atmospheric air thereinto. In the event that some non-condensible matter collects in the system, a purge function is provided which pumps excess coolant into the coolant jacket and radiator and flushes out any air or the like each time the engine is started with the coolant temperature below a predetermined level.

13 Claims, 12 Drawing Figures

COOLING SYSTEM FOR USE IN CAB-OVER TYPE VEHICLES

BACKGROUND OF THE INVENTION

1. Field of the Invention

The present invention relates generally to cab-over vehicles and more specifically to a internal combustion engine cooling system for use in cab-over type vehicles.

2. Description of the Prior Art

As shown in FIG. 1 of the drawings, in cab-over type vehicles, due to the location of the engine beneath the driver's seat and front passenger's seat, the requirement for leg room immediately forward of the seats causes the engine to be enclosed as shown. This induces a problem that natural ventilation of the engine compartment is greatly inhibited as the air, after flowing under the forward passenger floor, must then change direction (as shown by the arrows). Subsequently, after passing over the radiator and engine, the air is again required to change direction and flow downwardly so as to pass under the vehicle. Further, in compact cab-over vehicles the amount of leg room tends to be insufficient due to the location of the radiator forward of the engine. Accordingly, to increase the amount of space available in the front of such vehicles relocation of the engine radiator to another site would prove extremely beneficial. However, with convential type cooling systems location of the radiator distal from the engine induces the problem that the relatively long conduits between the engine and the radiator increase the load on the engine water pump. Further, if the radiator is disposed on top of the vehicle not only does the increased flow restriction caused by the long conduiting between the engine and radiator increase the load on the pump, but the water must be lifted vertically through a notable distance from the engine to the roof. Moreover, the bulk of conventional water circulation type cooling system radiators causes aesthetic disposition of same in such locations extremely difficult.

FIG. 2 of the drawings shows an arrangement disclosed in U.S. Pat. No. 1,806,382 issued on May 19, 1931 in the name of L.P. Barlow wherein it has been proposed to cool the engine via permitting the engine coolant to boil and condensing the vapor produced in a radiator disposed on the roof of the vehicle. This concept while being highly compatible with the design needs of the cab-over type vehicles has suffered from the drawback that the radiator heat exchange efficiency is rapidly lost due to the inclusion of air in the system. This air which leaks in during non-use tends to form embolism-like bubbles which hinder the flow of steam or like vapor and which reduce the surface area available for heat exchange. In an attempt to overcome this problem a steam trap is provided to permit air to be vented and coolant loss minimized. However, due to the tendency for air to rise when heated, once the system becomes contaminated with air, purging of same from the relatively high positioned radiator using coolant vapor has not been possible to any acceptable extent.

Further, when this system is operated at high altitudes, the rate at which coolant is lost from the system through the steam trap is unacceptably high.

Various other so called "vapor cooled" engine systems have been developed (set forth hereinblow) but none have proven successful due to air contamination, loss of coolant and/or undue complexity.

FIG. 3 shows an arrangement disclosed in Japanese Patent Application Second Provisional Publication No. Sho 57-57608. This arrangement has attempted to vaporize a liquid coolant and use the gaseous form thereof as a vehicle for removing heat from the engine. In this system the radiator 1 and the coolant jacket 2 are in constant and free communication via conduits 3 and 4 whereby the coolant which condenses in the radiator 1 is returned to the coolant jacket 2 little by little under the influence of gravity.

This arrangement has suffered from the drawbacks that the radiator, depending on its position with respect to the engine proper tends to be at least partially filled with liquid coolant. This greatly reduces the surface area via which the gaseous coolant (for example steam) can effectively release its latent heat of vaporization and accordingly condense and thus has lacked any notable improvement in cooling efficiency.

Further, with this system in order to maintain the pressure within the coolant jacket and radiator at atmospheric level, a gas permeable water shedding filter 5 is arranged as shown, to permit the entry of air into and out of the system. However, this filter permits gaseous coolant to gradually escape from the system, inducing the need for frequent topping up of the coolant level.

A further problem with this arrangement has come in that some of the air, which is sucked into the cooling system as the engine cools, tends to dissolve in the water, whereby upon start up of the engine, the dissolved air tends to form small bubbles in the radiator which adhere to the walls thereof forming an insulating layer. The undissolved air tends to collect in the upper section of the radiator and inhibit the convention-like circulation of the vapor from the cylinder block to the radiator. This of course further deteriorates the performance of the device.

European Patent Application Provisional Publication No. 0 059 423 published on Sept. 8, 1982 discloses another arrangement wherein, liquid coolant in the coolant jacket of the engine, is not circulated therein and permitted to absorb heat to the point of boiling. The gaseous coolant thus generated is adiabatically compressed in a compressor so as to raise the temperature and pressure thereof and is introduced into a heat exchanger. After condensing, the coolant is temporarily stored in a reservoir and recycled back into the coolant jacket via a flow control valve.

This arrangement has suffered from the drawback in that air tends to leak into the system upon cooling thereof. This air tends to be forced by the compressor along with the gaseous coolant into the radiator. Due to the difference in specific gravity, the air tends to rise in the hot environment while the coolant which has condensed moves downwardly. The air, due to this inherent tendency to rise, forms large bubbles of air which cause "embolism-like" blockages in the radiator and badly impair the heat exchange ability thereof.

U.S. Pat. No. 4,367,699 issued on Jan. 11, 1983 in the name of Evans (see FIG. 4 of the drawings) discloses an engine system wherein the coolant is boiled and the vapor used to remove heat from the engine. This arrangement features a separation tank 6 wherein gaseous and liquid coolant are initially separated. The liquid coolant is fed back to the cylinder block 7 under the influence of gravity while the "dry" gaseous coolant (steam for example) is condensed in a fan cooled radiator 8. The temperature of the radiator is controlled by selective energizations of the fan 9 to maintain a rate of condensation therein sufficient to maintain a liquid seal at the bottom of the device. Condensate discharged from the radiator via the above mentioned liquid seal is collected in a small reservoir-like arrangement 10 and pumped back up to the separation tank via a small pump 11.

This arrangement, while providing an arrangement via which air can be initially purged to some degree from the system tends to, due to the nature of the arrangement which permits said initial non-condensible matter to be forced out of the system, suffer from rapid loss of coolant when operated at relatively high altitudes. Further, once the engine cools, air is relatively freely admitted back into the system. The provision of the separation tank 6 also renders engine layout difficult. In the event that the radiator of this system is placed on the vehicle roof, the difficulty of purging the air therefrom increases.

Japanese Patent Application First Provisional Publication No. Sho. 56-32026 (see FIG. 5 of the drawings) discloses an arrangement wherein the structure defining the cylinder head and cylinder liners are covered in a porous layer of ceramic material 12 and coolant sprayed into the cylinder block from shower-like arrangements 13 located above the cylinder heads 14. The interior of the coolant jacket defined within the engine proper is essentially filled with gaseous coolant during engine operation during which liquid coolant sprayed onto the ceramic layers 12. However, this arrangement has proved totally unsatisfactory in that upon boiling of the liquid coolant absorbed into the ceramic layers the vapor thus produced escaping into the coolant jacket inhibits the penetration of liquid coolant into the layers whereby rapid overheat and thermal damage of the ceramic layers 12 and/or engine soon results. Further, this arrangement is plagued with air contamination and blockages in the radiator similar to the compressor equipped arrangement discussed above.

In summary although the basic concepts of open and closed "vapor cooling" systems wherein the coolant is boiled to make use of the latent heat of evaporation thereof and condensed in a suitable heat exchanger, is known, the lack of a control system which is both sufficiently simple as to allow practical use and which overcomes the various problems plaguing the prior art is wanting. Placing the radiator well above the engine (such as on the vehicle roof) has increased the difficulty of removing contaminating air therefrom.

SUMMARY OF THE INVENTION

It is an object of the present invention to provide a cooling system for a cab-over type vehicle wherein the radiator can be disposed on the vehicle roof and thus permit a reduction in engine compartment size.

It is a further object to provide a cooling system for a cab-over type vehicle which permits the engine coolant to boil in the engine coolant jacket, which condenses the vapor in a vehicle roof mounted radiator or condensor and which includes a non-condensible matter purge function which senses the presence of non-condensible matter and positively purges same from the system upon the occurrence of a given phenomenon such as engine shutdown or startup.

It is a further object of the present invention to provide a cooling system of the nature set forth above which can vary the temperature of the engine according to the mode of operation and load on the vehicle engine.

In brief, these object are achieved by an arrangement wherein, in order to increase cabin space and simultaneously increase the amount of engine cooling which can be effected by natural air drafts which occur during forward running of the vehicle, the engine radiator is disposed on a forward portion of the vehicle roof and arranged to receive coolant vapor generated in the engine coolant jacket. The coolant is condensed and returned to the coolant jacket via a level sensor controlled pump in a manner which maintains the structure of the engine subject to high heat flux securely immersed in coolant.

When the engine is stopped the negative pressure which develops due to the condensation of the vapor is used to induct coolant from a reservoir in a manner to fill the system and obviate any negative pressure which would otherwise tend to induct contaminating atmospheric air thereinto. In the event that some non-condensible matter collects in the system, a purge function is provided which pumps excess coolant into the coolant jacket and radiator and flushes out any air or the like each time the engine is started with the coolant temperature below a predetermined level.

More specifically the present invention takes the form of a cab-over type vehicle having a roof, an engine compartment, an engine disposed in the engine compartment, a cooling system for said engine comprising: a coolant jacket formed about the engine, a radiator, the radiator being disposed on the roof, a vapor transfer conduit leading from the engine to the radiator for conducting gaseous coolant from the engine to the radiator, a return conduit leading from the radiator to the coolant jacket, a pump for pumping liquid coolant from the radiator to the coolant jacket, the pump being disposed in the return conduit, a liquid coolant reservoir, a valve interposed between the reservoir the coolant jacket which permits fluid communication between the reservoir and the coolant jacket when the engine is stopped and which cuts off the fluid communication when the engine is running and excess coolant has been displaced out of the coolant jacket to the reservoir and a predetermined amount of coolant remains in the coolant jacket.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Before proceeding with the description of the actual embodiment of the present invention, it is deemed advantageous to firstly discuss the concepts on which the present invention is based.

Figure 1:
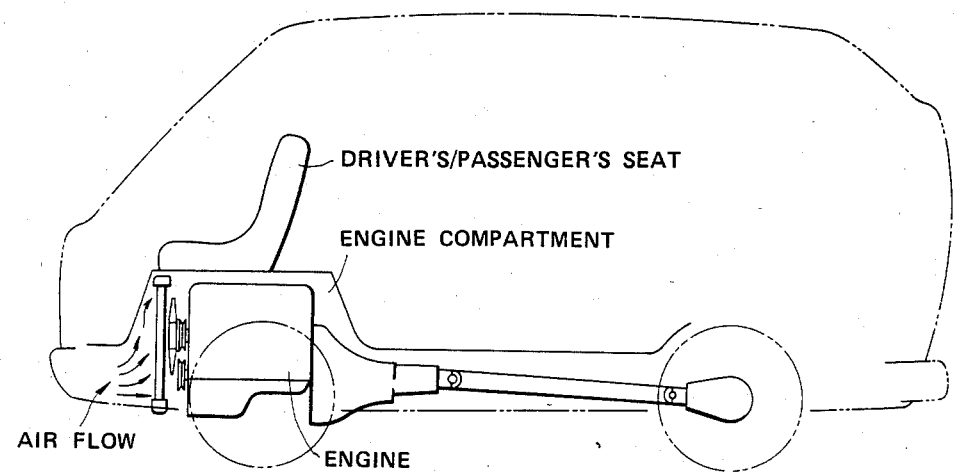
FIG. 1 is a schematic side elevation of a cab-over type vehicle of the type discussed in the opening paragraphs of the instant disclosure.
Figure 2:
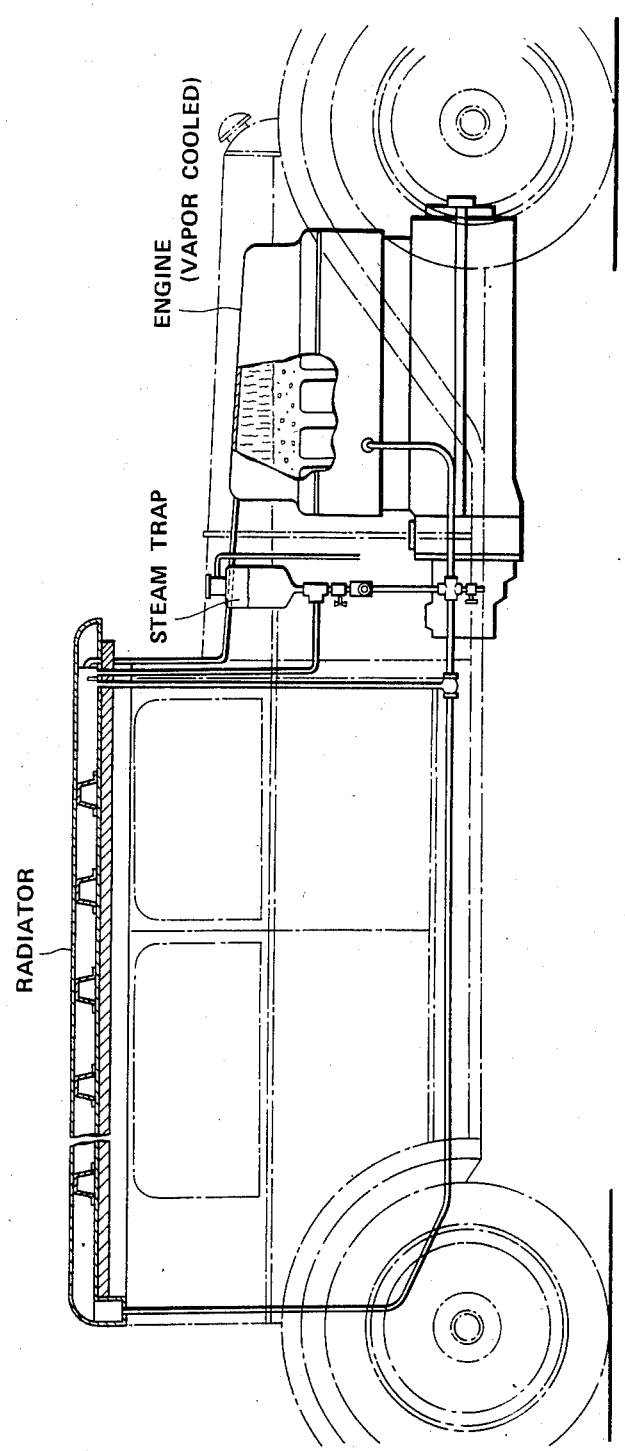
FIG. 2 a is side elevation of the prior art arrangement discussed hereinbefore wherein the radiator is disposed on the roof of the vehicle.
Figure 3:
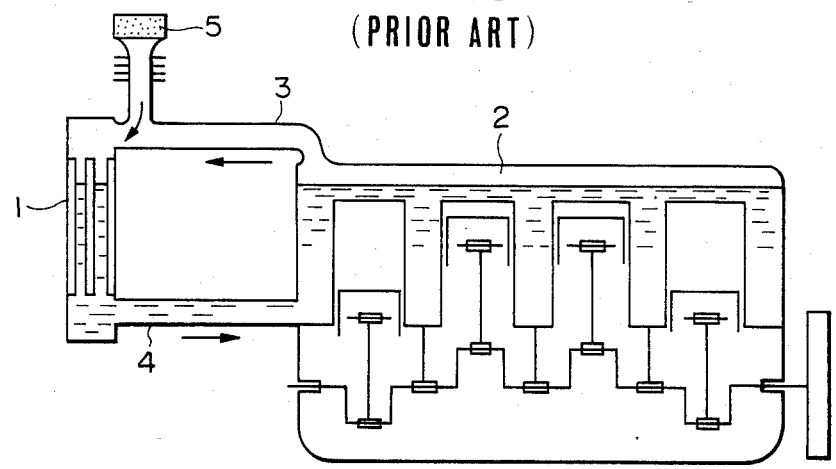
FIGS. 3 to 5 show other prior art arrangements discussed briefly hereinbefore.
Figure 4:
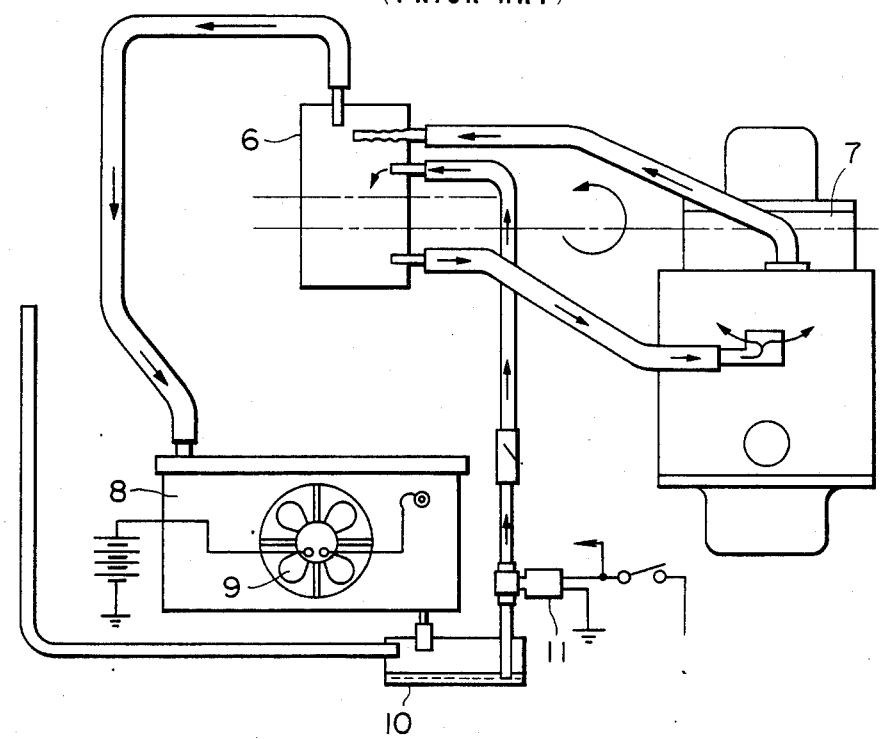
Figure 5:
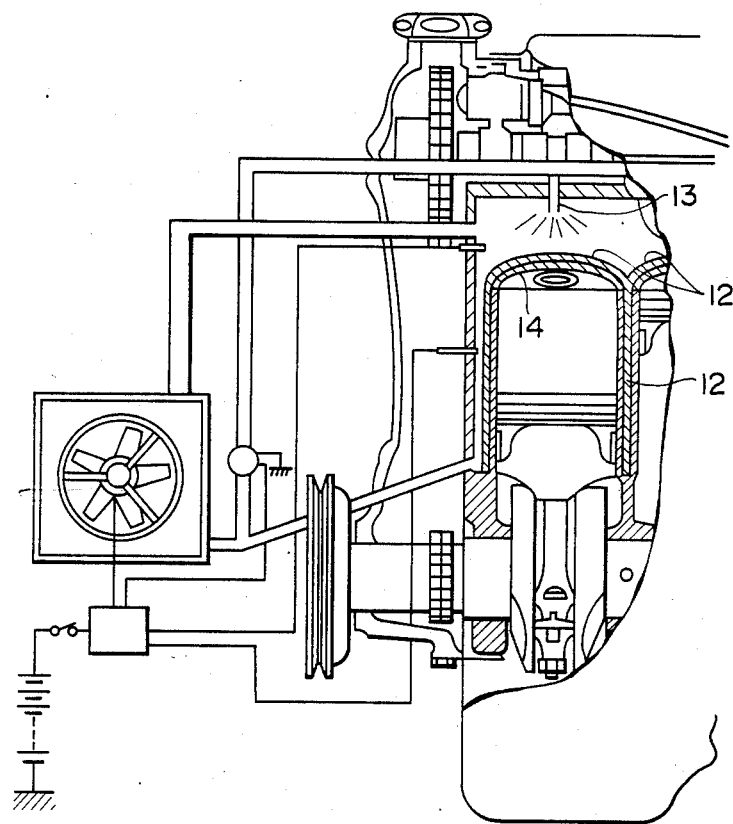
Figure 6:
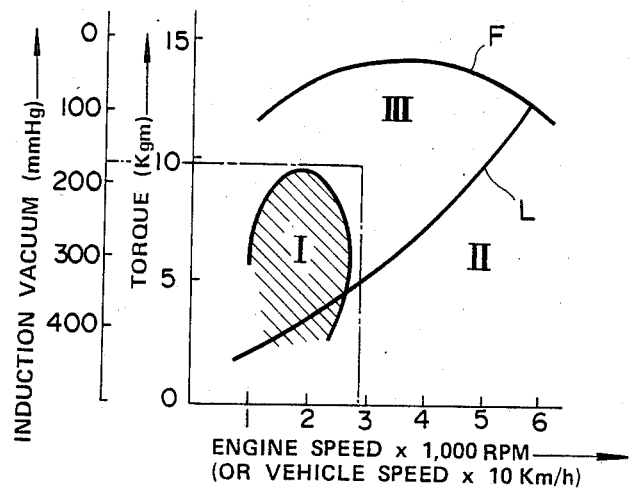
FIG. 6 is a graph showing in terms of engine load and engine speed the various operating zones in which it is advantageous to vary the temperature of the engine.

FIG. 6 graphically shows in terms of engine torque and engine speed the various load "zones" which are encountered by an automotive vehicle engine. In this graph, the the curve F denotes full throttle torque characteristics, trace L denotes the resistance encountered when a vehicle is running on a level surface, and zones I, II and III denote respectively "urban cruising", "high speed cruising" and "high load operation" (such as hillclimbing, towing etc.).

A suitable coolant temperature for zone I is approximately 110° C. while 90°-80° C. for zones II and III. The high temperature during "urban cruising" of course promotes improved fuel economy while the lower temperatures promote improved charging efficiency while simultaneously removing suffcient heat from the engine and associated structure to obviate engine knocking and/or engine damage in the other zones. For opertional modes which fall between the aforementioned first, second and third zones, it is possible to maintain the engine coolant temperature at approximately 100° C.

Figure 7:
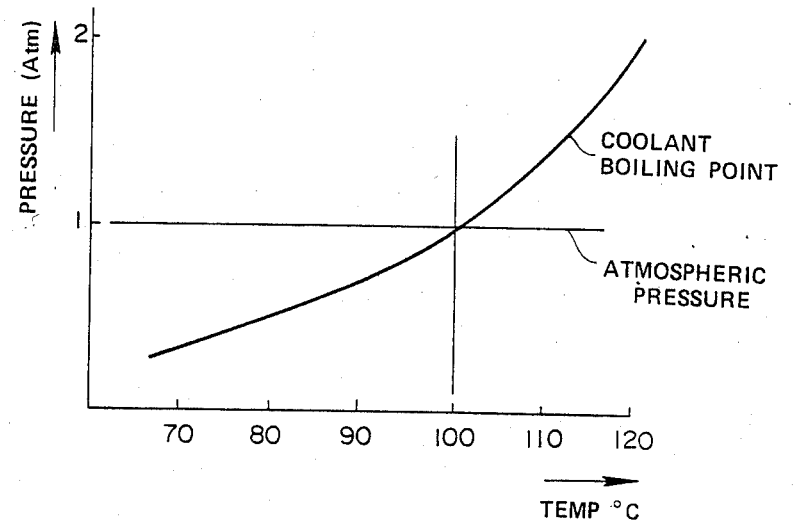
FIG. 7 is a graph showing in terms of Temperature and Pressure the effect of reducing the pressure within the cooling system of the invention on the boiling point of the coolant.

With the present invention, in order to control the temperature of the engine, advantage is taken of the fact that with a cooling system wherein the coolant is boiled and the vapor used a heat transfer medium, the amount of coolant actually circulated between the coolant jacket and the radiator is very small, the amount of heat removed from the engine per unit volume of coolant is very high, and upon boiling, the pressure prevailing within the coolant jacket and consequently the boiling point of the coolant rises if the system employed is closed. Thus, by circulating a controlled amount of cooling air over the radiator, it is possible to reduce the rate of condensation therein and cause the pressure within the cooling system to rise above atmospheric and thus induce the situation, as shown in FIG. 7, wherein the engine coolant boils at temperatures above 100° C.—for example at approximately 119° C. (corresponding to a pressure of approximately 1.9 at atmospheres).

On the other hand, during high speed cruising, it is further possible by increasing the flow of cooling air passing over the radiator (for example by energizing a cooling for), to increase the rate of condensation within the radiator to a level which reduces the pressure prevailing in the cooling system below atmospheric and thus induce the situation wherein the coolant boils at temperatures in the order of 80° to 90° C.

Figure 10:
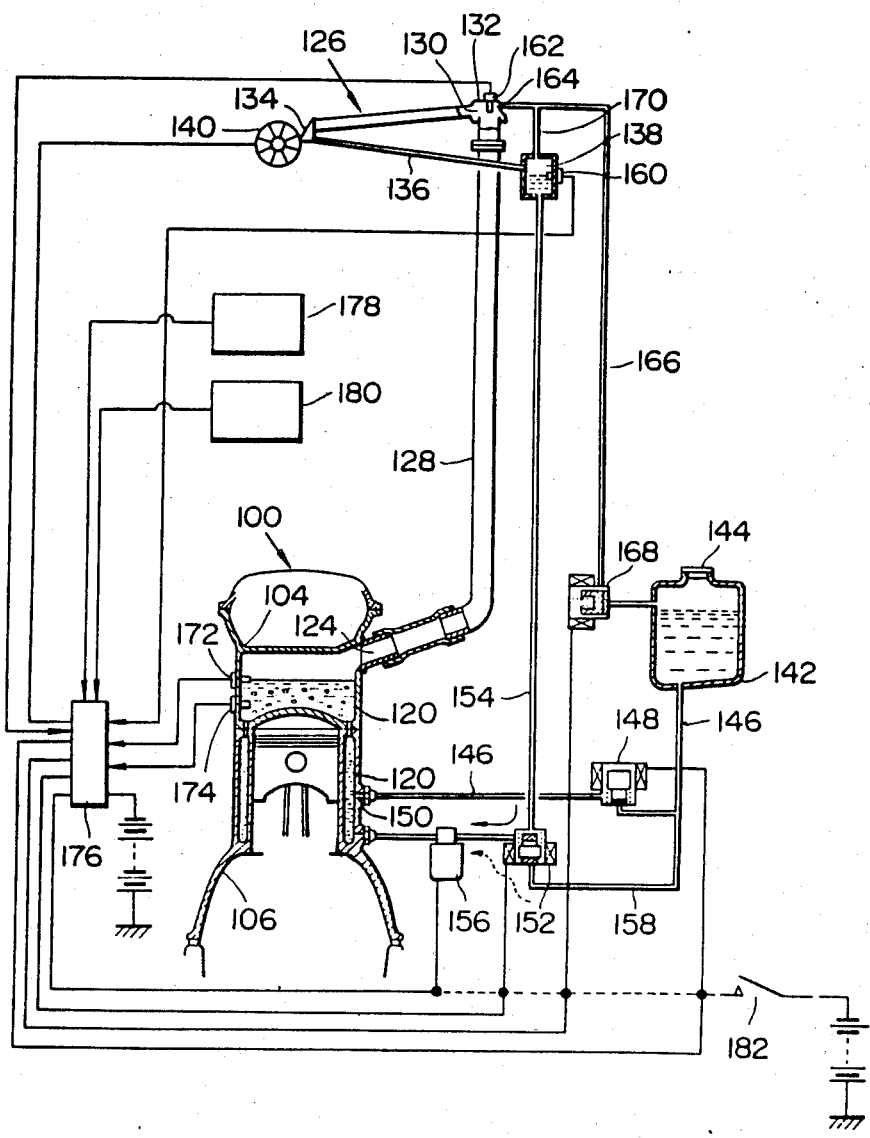
FIG. 10 shows in detail the cooling system which characterizes the present invention.

FIG. 10 shows in detail an engine system incorporating the present invention. In this arrangement an internal combustion engine 100 includes a cylinder block 106 on which a cylinder head 104 is detachably secured. The cylinder head and cylinder block include suitable cavities which define a coolant jacket 120 about the heated portions of the cylinder head and block. Fluidly communicating with a vapor discharge port 124 of the cylinder head 104 is a radiator or heat exchanger generally denoted by the numeral 126.

As shown, this radiator 126 is located on the roof 300 of the vehicle 400. In order to increase the aesthetic appearance of the arrangement, the roof panel is formed with a recess 302 and the radiator 126 disposed therein in a manner that air may pass both over and under the heat exchanging surfaces of same. By directing a relatively large flow under the arrangement, the amount of heat imparted to the roof panel is reduced thus reducing the need for heat insulation at this site. By suitably arranging the aperture at the forward end of the roof 300, it is possible to develop a ramming effect by taking advantage of the high pressure zone developed at the front of the vehicle 400 during forward motion.

The vapor transfer conduit 128 which interconnects the cylinder head 104 (viz., port 124) and the radiator is arranged to communicate with an aft end gallery 130 of the radiator arrangement 126. This gallery 130 as best seen in FIG. 10 is arranged to be slightly higher than the forward end of the device.

Formed in the aft end gallery 130 of the radiator 126 and essentially above the location where the vapor transfer conduit 128 connects with the radiator, is a riser-like portion 132. Located at the forward end of the radiator is a forward gallery 134 which interconnects the various heat exchanging conduits which lead downhill from the aft gallery 130. A drain conduit 136 leads from the forward gallery 134 to a small collection tank 138 located at a level slighly below the radiator 126.

Located suitably adjacent the radiator 126 is a electrically driven fan 140.

A coolant reservoir 142 is located beside the engine 100 as shown. In this embodiment the reservoir 142 is arranged at a level slightly higher than the engine for reasons which will become apparent hereinlater. An air permeable cap 144 is used to close the reservoir in a manner that atmospheric pressure continuously prevails therein.

The reservoir 142 fluidly communicates with the engine coolant jacket 120 via a supply conduit 146 and an electromagnetic valve 148. This valve 148 is arranged to be closed when energized and to establish fluid communication between the reservoir 142 and a port 150 formed in a lower portion of the coolant jacket 120 when de-energized.

A second "three-way" electromagnetic valve 152 is disposed in a return conduit 154 and arranged to establish fluid communication between a pump 156 and the small collection tank or reservoir 138 provided below the radiator 126, when de-energized and establish fluid communication between the pump 156 and the reservoir 142 via conduits 146 and 158 when energized.

A first coolant level sensor 160 is disposed in the collection tank 138.

A second coolant level sensor 162 is disposed in a riser-like portion 132 formed in the radiator 126. This sensor 162 is located immediately adjacent a "purge" port 164. This "purge" port 164 communicates with the reservoir 168 via an overflow conduit 166. A normally closed third electromagnetic valve 168 is disposed in the overflow conduit 166. This valve is opened when energized. A short circuit 170 leads from the top of the collection tank 138 and merges with the overflow conduit 166 at a location close to the purge port 164.

In order to control the level of coolant in the coolant jacket 120, a third level sensor 172 is disposed as shown. It will be noted that this sensor 172 is located at a level higher than that of the combustion chambers, exhaust ports and valves (structure subject to high heat flux) so as to maintain same securely immersed in coolant and therefore attenuate engine knocking and the like due to the formation of localized zones of abnormally high temperature or "hot spots".

Located below the level sensor 172 so as to be immersed in the liquid coolant is a temperature sensor 174. The output of the level sensor 172 and the temperature sensor 174 are fed to a control circuit 176 or modulator which is suitably connected with a source of EMF upon closure of a switch 177 (see FIG. 11). This switch of course may advantageously be arranged to be simultaneously closed with the ignition switch of the engine (not shown).

The control circuit 176 further receives an input from an engine distributor 178 (or like device) indicative of engine speed and an input from a load sensing device 180 such as a throttle valve position sensor. It will be noted that as an alternative to throttle position, the output of an air flow meter or an induction vacuum sensor may used to indicate load.

Prior to initial use, it is necessary to completely fill the system (viz., the coolant jacket 120, the radiator 126 and all of the conduiting therebetween) with coolant (e.g. water or a mixture of water and anti-freeze) so as to positively exclude all air and like non-condensible matter from the system. In order to accomplish this, the present embodiment includes switch 182 which, as shown, is circuited between a source of EMF, pump 156 and electromagnetic valves 148, 152 and 168. By placing sufficient coolant in the reservoir 142 (or alternatively removing the cap 144 and continuously adding coolant) and closing switch 182, the situation arises wherein valve 152 is energized to establish communication between the reservoir 142 and the coolant jacket 120 via conduits 146 and 158, while due to the energization of valve 148, the latter closes to prevent communication between the reservoir 142 and the coolant jacket 120 via conduit 146, and opens valve 168 which controls the overflow conduit 166. Simultaneously pump 156 is energized. This accordingly causes coolant to the inducted from the reservoir 142 and forced into the coolant jacket 120 via port 184. As valve 148 is closed (energized) coolant is prevented from returning to the reservoir 142 and accordingly gradually fills the coolant jacket 120, vapor transfer conduit 128, radiator 126, and a collection tank 160. Subsequently, coolant overflows via the purge port 164, over flow conduit 166 and electromagnetic valve 168 into the reservoir 142 and purges out the non-condensible matter (viz., air) from the system.

Upon this phenomenon occurring, switch 182 can be opened and the system allowed to assume an essentially air and other non-condensible matter-free state ready for use.

Of course switch 182 can be used for regular maintenance maintainence purposes as well as initially filling of the system.

When the engine is started, as the system is completely filled with coolant very little heat can be removed from the engine and the coolant quicky warms. Before reaching a predetermined temperature (for example 35° C.) any air in the system, such as that dissolved in the coolant per se, tends to be forced out of solution by the heating and rise to collect in the riser portion 132. At this time, as the level of coolant falls below that of the level sensor 162, the control circuit 176 energizes the electromagnetic valves 148, 152 and 168 and the pump 156. This energization may be continued for a predetermined short period of time (e.g. three or four seconds) after the level sensor 162 indicates the level having risen thereto. This procedure closes valve 148, moves valve 152 to the position wherein communication is established between the pump 156 and the reservoir 142 and opens the overflow conduit 166 (via opening of the valve 168). Accordingly, pump 156 draws coolant from the reservoir 142 via conduit 158 and forces same into the system overfilling same. The excess coolant displaces the air or other non-condensible matter out through the overflow conduit 166.

Upon the previously mentioned predetermined temperature being exceeded, this "purge" mode is terminated and the valves 148, 152 and 168 and pump 156 are de-energized.

Subsequently, the coolant temperature continues to rise and begins generating vapor pressure within the system. This pressure displaces coolant back out through valve 148 (now de-energized) to the reservoir 142 until level sensor 172 is uncovered. This induces the energization of the pump 156 which inducts coolant from the radiator 126 and discharges same into the cylinder block 106 through port 184. This tends to drain the radiator 126 while maintaining the level of the coolant within the coolant jacket 120 block at that of level sensor 172.

This procedure is continued until the level of coolant in the collection tank 138 falls to that of level sensor 160, whereupon the valve 148 is energized (closed) and system placed in a "closed" condition.

In order to control the temperature within the coolant jacket the control circuit 176 selectively energizes fan 140 in a manner to induce a rate of condensation in the radiator 126 which controls the pressure prevailing in the cooling system to a level whereat the coolant boils at a temperature suited to the particular load and/or engine speed conditions of the engine.

Upon stoppage of the engine 100, valve 148 is de-energized (preferably with a slight delay to allow for "thermal inertia") and, as the vapor pressure within the radiator 126 and coolant jacket 120 falls due to the cooling of the engine and the condensation of the coolant vapor therein, coolant flows into the system from the reservoir 142 via the valve 148 under the influence of atmospheric pressure acting on the surface of the coolant in the reservoir 142 and under the influence of gravity (it being noted that the reservoir 142 is located slightly above the engine per se) until the system is filled.

Filling of the cooling system in this manner obviates any tendency for sub-atmospheric conditions to prevail and for any air to be inducted.

Upon the engine being started again, if the temperature has fallen below 35° C. (by way of example only) the previously disclosed "purge" mode will be initiated should level sensor 160 indicate that the riser portion 132 is not completely filled with coolant.

Figure 11:
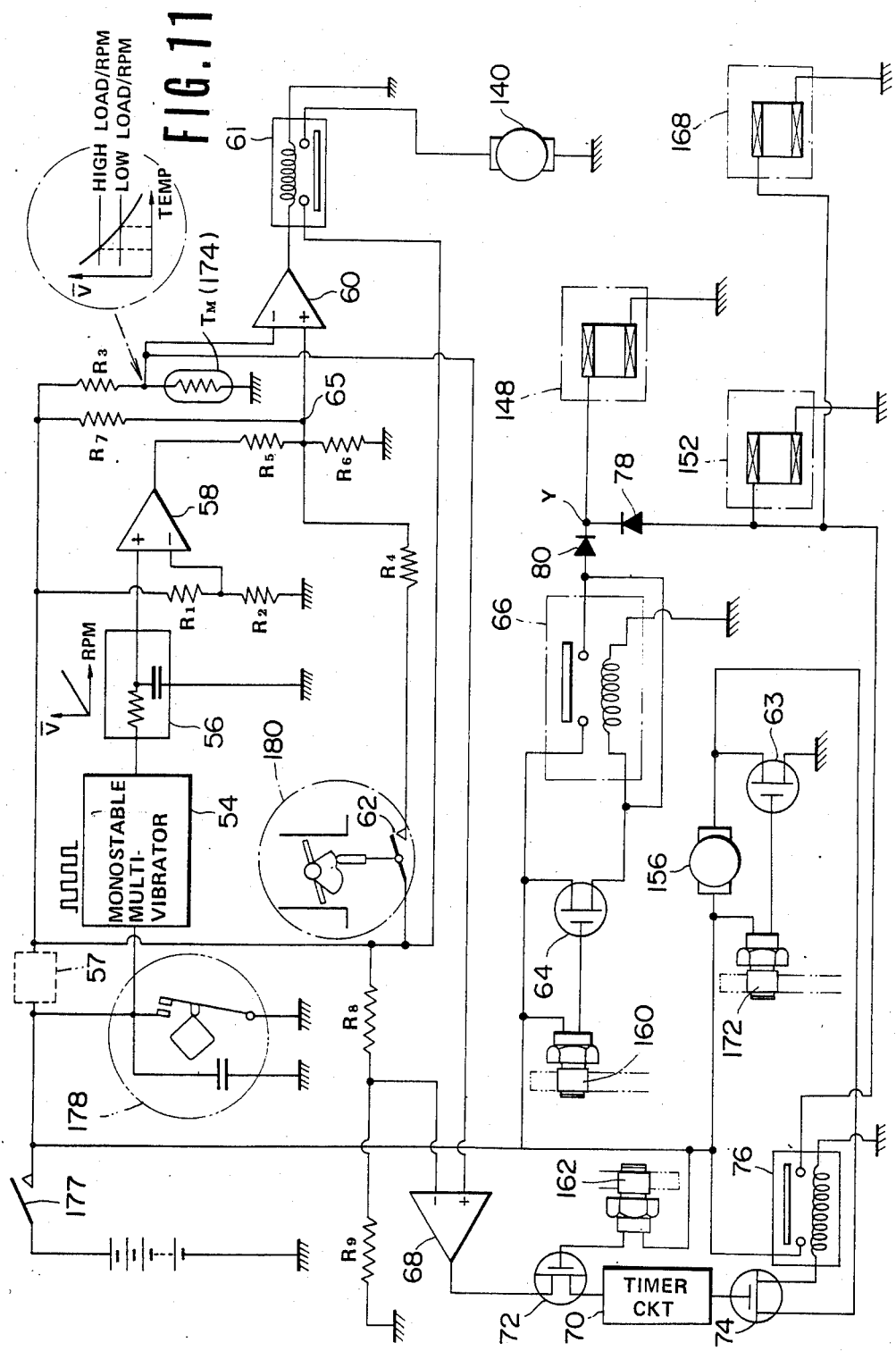
FIGS. 11 and 12, show examples of circuitry which can be used to control the operation of the valves and motors included in the embodiment of the present invention.
Figure 12:
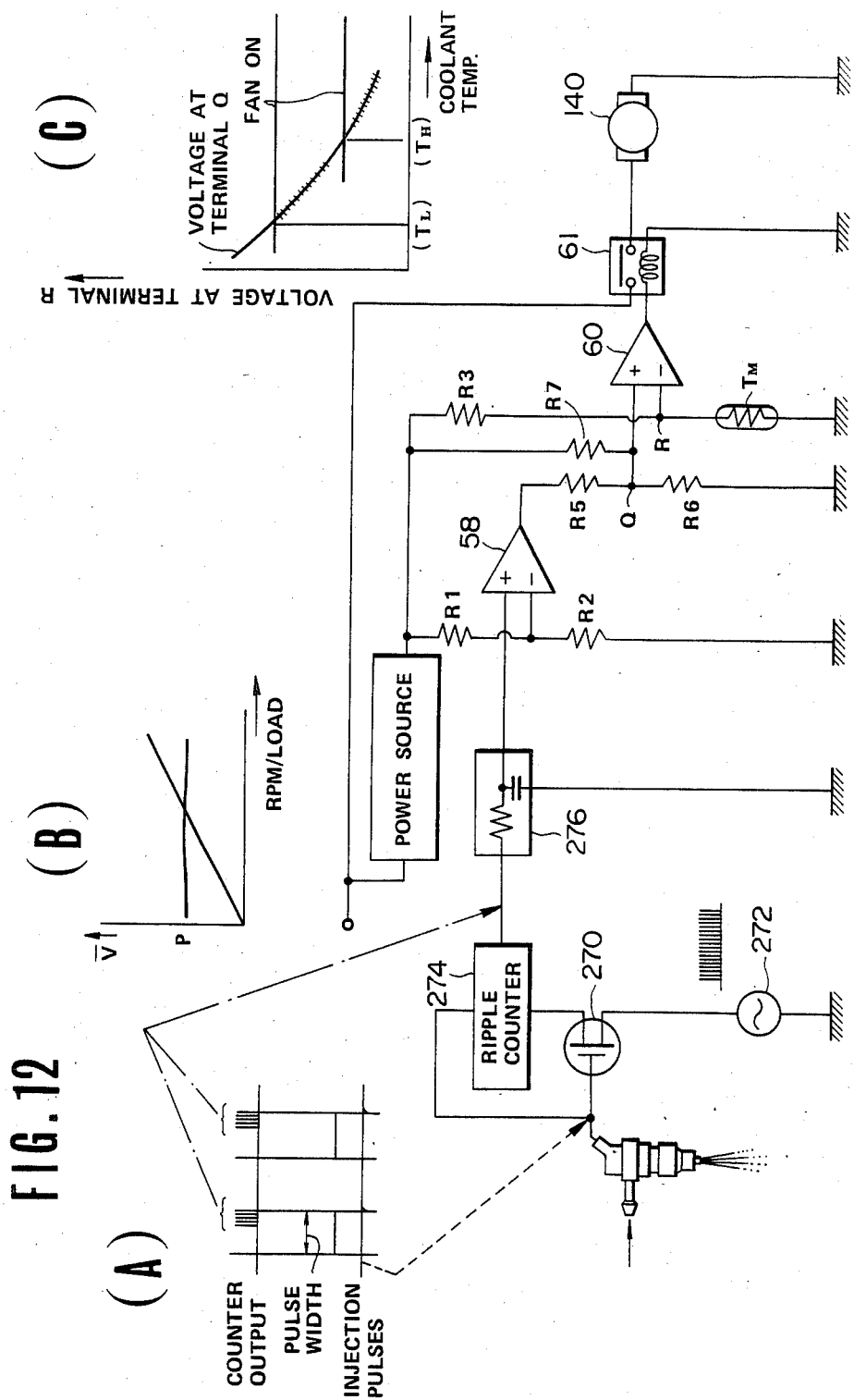

FIG. 12 shows a circuit suitable for controlling the valves 148, 156 and 168, pump 156 and fan 140 shown in FIG. 11.

In this circuit arrangement the distributor 178 of the engine ignition system is connected with the source of EMF via the switch 177. A monostable multivibrator 54 is connected in series between the distributor 178 and a smoothing circuit 56. A DC-DC converter 57 is arranged, as shown in broken line, to ensure a supply of constant voltage. A first voltage divider consisting of resistors R1 and R2 provides a comparator 58 with a reference voltage at its inverting input (−) thereof while the non-inverting input (+) of said comparator receives the output of the smoothing circuit 56. A second voltage dividing arrangement consisting of a resistor R3 and a thermistor $T_M$ (viz., the heart of the temperature sensor 174) applies a variable voltage to a second comparator 60 which also receives a signal from a cam operated throttle switch 62 via a resistor arrangement including resistors R4, R5, R6 and R7 connected as shown. The output of the comparator 60 is applied to the fan 140 via a relay 61 for energizing same.

The circuit further includes a transistor 63 which acts a switch upon receiving an output from the level sensor 172 to establish a circuit between the source of EMF and ground. As a safety measure, an inverter or the like (not shown) may be interposed between the level sensor 172 and the transistor 63, and the level sensor adapted to produce an output when immersed in coolant. With this arrangement should the level sensor malfunction, the lack of output therefrom causes the transistor 63 to be continuously rendered conductive and the pump 156 continually energized to ensure that an adequate amount of coolant is maintained in the coolant jacket 120.

In order to acheive the desired control of valve 148, level sensor 160 is circuited via transistor 64 with a self-energizing relay 66 in a manner that, until the level of the coolant in the collection tank 138 is forced down to the level of the level sensor 160, the relay 66 is not closed and the solenoid of the valve 148 not energized, whereby the desired amount of coolant contained in the radiator 126 and coolant jacket 120 can be appropriately adjusted. Opening of the switch 177 de-energizes the solenoid of the valve 148 and opens the self energizing relay 66.

As will be appreciated, with the circuit thus far disclosed, depending on the load and engine speed, the temperature of the coolant in the coolant jacket 120 will be adjusted in a manner that at low engine speeds and loads the, voltage appearing at the inverting terminal (−) of the comparator 60 will be compared with the voltage appearing on the non-inverting terminal (+) thereof and the fan 140 suitably energized to maintain a high temperature under so called "urban cruising" conditions and lowered at high load/speed operation. Further, upon stoppage of the motor, the coolant jacket 120 and radiator 126 will be completely filled with coolant to exclude the possibility of air contamination.

This circuit further includes a comparator 68 which receives the output of second voltage divider (R3, $T_M$) on its non-inverting terminal (+) and a reference voltage from a voltage divider consisting of resistors R8, R9 on its inverting one (−). The resistances of the resistors R8, R9 are selected to provide a voltage representative of the predetermined temperature (viz., 35° C.).

The output of this comparator 68 is fed to a timer circuit 70 via transistor 72. The base of this transistor 72 is connected with level sensor 162 so that upon the level falling below same, the sensor 162 outputs a signal rendering the transistor 72 conductive. The timer circuit 70 may be arranged to maintain a high level output for a short period of time after the high level output of the comparator 68 disappears (3–4 seconds for example). The output of the timer circiut 70 is fed to the base of a transistor 74 which as shown serves a switch for energizing relay 76. This relay 76 upon being closed by a current passing through the coil thereof (via the pump 156 and the transistor 74), supplies current to the solenoids of valves 152, 168. So as to temporarily close valve 148, the relay 76 is connected to the solenoid of valve 148 through a diode 78. To prevent unwanted closure of the relay 66, a second diode 80 is disposed as shown, to prevent current from flowing from terminal Y to ground through the coil of relay 66.

As will be appreciated if the temperature of the coolant as sensed by the termister Tm is below 35°0 C. and the level of coolant is below that of level sensor 162, then valves 148, 152 and 168 and the pump 156 will be energized.

If desired the timer circuit 70 may be omitted.

Figure 8:
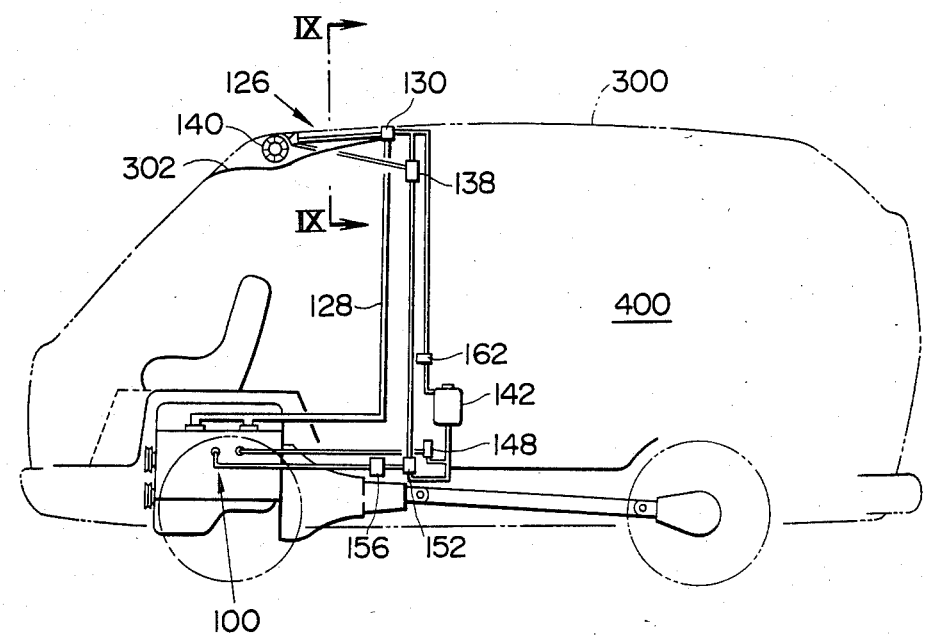
FIG. 8 is a side elevation similar to that shown in FIG. 1 which shows an embodiment of the present invention.
Figure 9:
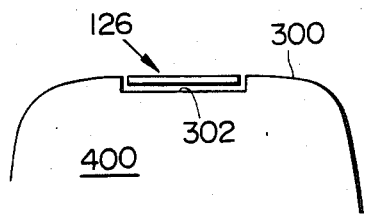
FIG. 9 is a front sectional elevation as taken along section line IX—IX of FIG. 8 showing a possible manner in which the radiator of the embodiment shown in FIG. 6 may be disposed on a vehicle roof.

FIG. 8 shows a second circuit arrangement which may be employed in the case the engine 100 is equipped with a fuel injection system.

This alternative arrangement differs from that shown in FIG. 7 by the inclusion of a transistor 270, a clock circuit 272, a ripple counter 274 and a smoothing circuit 276, all connected as shown. Due to the fact that the frequency of injection control pulses varies with engine speed and the voltage output of the smoothing circuit 276 varies with pulse width as well as the frequency of injection, it is possible to use this arrangement in place of both of the throttle switch 62 and distributor 178 as will be appreciated by those skilled in the art. For the sake of simplicity the level sensors 169, 162 and 172 and associated circuitry have been omitted from this figure.

More specifically, the operation of the FIG. 7 circuit is such that when the injector driving signal is applied to the base of the transistor 270 and the output of the clock generator 272 is fed to the ripple counter 274. The characteristics of the ripple counter 274 are so selected that it outputs a carry only when the width of the injection pulses are greater than a predetermined value (viz., indicative of a load in excess of a predetermined value). The injection driving pulses are applied to the reset terminal of the counter 274. Upon the width of the injection pulse exceeding said predetermined value, the ripple counter 274 will output a carry (a number of clock pulses) which varies with the width of the pulse in excess of the predetermined value, as will be clear from insert "A". The output of the smoothing circuit 276 accordingly increases with engine speed and load (pulse width). The output of the smoothing circuit 276 is applied to the non-inverting terminal (+) of the comparator 58 which receives a fixed reference voltage from the voltage divider defined by resistors R1 and R2 on its inverting one (−). Accordingly, upon the voltage level of the smoothing circuit 276 output exceeding that provided by the R1–R2 voltage divider (see voltage P in insert "B"), the comparator produces an output to terminal Q.

The voltage appearing at terminal R decreases with increase of coolant temperature due to the inherent characteristics of the thermistor $T_M$. Accordingly, if the voltage appearing on terminal R is at a high level due to the engine operating at high load/speed conditions, the fan 140 will be energized to maintain a low coolant temperature ($T_L$) as will be clear from insert "C". On the other hand, should the engine be operating under the so called "urban cruising" conditions, the voltage appearing on terminal Q will be low due to absence of an output from the comparator 58 and the fan 140 will be operated in a manner to reduce the rate of condensation in the radiator 126 and raise the temperature of the coolant to a high level ($T_H$).

A microprocessor may be used in place of the above disclosed circuits. This processor of course may also be used for other engine control functions as well known in the art of engine control. The program via which the embodiment shown in FIG. 11 can be controlled is deemed relatively simple and well within the perview of one skilled in the art of computer programming and thus will not be discussed for brevity.

It will be noted that, if deemed advantageous, the temperature of the engine coolant may be varied continuously with change in load and/or engine speed as different form the stepwise control disclosed hereinbefore.

In summary, the present invention features an arrangement highly suited for use in cab-over type vehicles in that the size of the radiator to be placed on the roof of the vehicle is, due to the very high rate at which heat is released to the ambient atmosphere using the vapor cooling technique, extremely compact and thus facilitate an aesthetic disposition of same on the vehicle roof. By disposing the radiator on the roof, the space formerly required by the bulky water circulation type radiator can be used to increase cabin space and therefore passenger comfort.

Further, even though the radiator is placed on the roof, the system according to the invention provides for securely displacing any non-condensible matter that may find its way into the system such as during high load operation when the pressure in the system becomes sub-atmospheric, each time the engine is stopped or alternatively under manual purge control.

What is claimed is:

1. In a cab-over type vehicle having:
a roof;
an engine compartment;
an engine disposed in said engine compartment;
a cooling system for said engine comprising:
a coolant jacket formed about said engine;
a radiator, said radiator being disposed on said roof and communicating with said coolant jacket via a vapor transfer conduit;
a return conduit leading from said radiator to said coolant jacket;
a pump for pumping liquid coolant from said radiator to said coolant jacket via said return conduit;
a liquid coolant reservoir;
a valve interposed between said reservoir and said coolant jacket, said valve controlling fluid communication between said coolant jacket and said reservoir;
a control circuit, said control circuit conditioning said valve in a manner which permits fluid communication between said reservoir and said coolant jacket when said engine is stopped and which selectively cuts off said fluid communication when the engine is running.

2. A cooling system as claimed in claim 1, further comprising:
a first level sensor disposed in said coolant jacket, said level sensor being disposed at a level higher than a structure of the engine subject to high heat flux, the output of said level sensor being used to control said pump in a manner to maintain the level of coolant in said coolant jacket at said predetermined level.

3. A cooling system as claimed in claim 1, further comprising:
a device for increasing the rate of condensation of said gaseous coolant in said radiator; and
a sensor disposed in said coolant jacket, said sensor being responsive to one of the temperature and pressure in said coolant jacket, said device being responsive to the output of said sensor so as increase the rate of condensation in said coolant jacket upon the temperature or pressure of the coolant in said coolant jacket exceeding a predetermined maximum level.

4. A cooling system as claimed in claim 3, further comprising:
an engine load sensor;
wherein said control is circuit responsive to said load sensor for modifying the value of said predetermined maximum value in response to the load on said engine.

5. In a cab-over type vehicle having:
a roof;
an engine compartment;
an engine disposed in said engine compartment;
a cooling system for said engine comprising:
a coolant jacket formed about said engine;
a radiator, said radiator being disposed on said roof;
a vapor transfer conduit leading from said engine to said radiator for conducting gaseous coolant from said engine to said radiator;
a return conduit leading from said radiator to said coolant jacket;
a pump for pumping liquid coolant from said radiator to said coolant jacket, said pump being disposed in said return conduit;
a liquid coolant reservoir;
means for permitting fluid communication between said reservoir and said coolant jacket when said engine is stopped and means for cutting off said fluid communication when the engine is running and excess coolant has been displaced out of said coolant jacket to said reservoir and a predetermined amount of coolant remains in said coolant jacket; and
a first level sensor disposed in said coolant jacket, said level sensor being disposed at a level higher than a structure of the engine subject to high heat flux, the output of said level sensor being used to control said pump in a manner to maintain the level of coolant in said coolant jacket and said predetermined amount.

6. A cooling system as claimed in claim 5, further comprising a collection tank fluidly interposed between said radiator and said pump, said collection tank being located at a level slightly below said radiator.

7. A cooling system as claimed in claim 6, further comprising a second level sensor disposed in said collection tank for sensing the level of coolant at a second predetermined level which is lower than said radiator.

8. A cooling system as claimed in claim 7, wherein said radiator is formed with a riser portion at the highest section thereof, and which further comprises a third level sensor disposed in said riser for sensing the level of coolant rising to a level whereat the radiator is completely filled with liquid coolant.

9. A cooling system as claimed in claim 8, further comprising means responsive to said first, second and third level sensors, and said sensor which senses said one of temperature and pressure, for selectively operating valve means for,
(a) when the engine is stopped, filling the radiator and coolant jacket completely with liquid coolant from said reservoir,
(b) displacing coolant from the radiator and coolant jacket after the engine is started until a predetermined amount of coolant remains in said coolant jacket, and
(c) maintaining said predetermined amount of coolant in said coolant jacket subsequent to engine warm up.

10. In a cab-over type vehicle having:
a roof;
an engine compartment;
an engine disposed in said engine compartment;
a cooling system for said engine comprising:
a coolant jacket formed about said engine;
a radiator, said radiator being disposed on said roof;
a vapor transfer conduit leading from said engine to said radiator for conducting gaseous coolant from said engine to said radiator;
a return conduit leading from said radiator to said coolant jacket;
a pump for pumping liquid coolant from said radiator to said coolant jacket, said pump being disposed in said return conduit;
a liquid coolant reservoir;
said valve controlling fluid communication between said coolant jacket and said reservoir;
a control circuit, said control circuit conditioning said valve in a manner which permits fluid communication between said reservoir and said coolant jacket when said engine is stopped and which cuts off said fluid communication when the engine is running and excess coolant has been displaced out of said coolant jacket to said reservoir and a predetermined amount of coolant remains in said coolant jacket;
a device for increasing the rate of condensation of said gaseous coolant in said radiator;
a sensor responsive to one of the temperature and pressure in said coolant jacket, said device being responsive to the output of said sensor so as increase the rate of condensation in said coolant jacket upon the temperature or pressure of the coolant in said coolant jacket exceeding a predetermined maximum level; and
an engine load sensor;
wherein said control circuit is responsive to said load sensor for modifying the value of said predetermined maximum value in response to the load on said engine.

11. A cooling system as claimed in claim 10, further comprising an engine speed sensor, said control circuit being arranged to be responsive to the output of said engine speed sensor in a manner to modify said predetermined maximum valve when both of the engine speed and engine load are above given respective levels.

12. A cooling system as claimed in claim 10, wherein said device is located forward of said radiator with respect to the direction of forward travel of said vehicle.

13. A cooling system as claimed in claim 10, wherein said radiator is arranged so that the vapor from said vapor transfer conduit is introduced thereinto at an aft location of the radiator, said radiator being arranged so that level of the aft end thereof is higher than the forward end, whereby the liquid coolant produced by the condensation of the gaseous coolant, flows through the radiator toward the front of the vehicle.

* * * * *